Aug. 12, 1969     R. E. HASSELBACHER     3,460,845
SEAL FOR HELICOPTER ROTOR BLADE PITCH CONTROL MECHANISM
Filed March 23, 1966
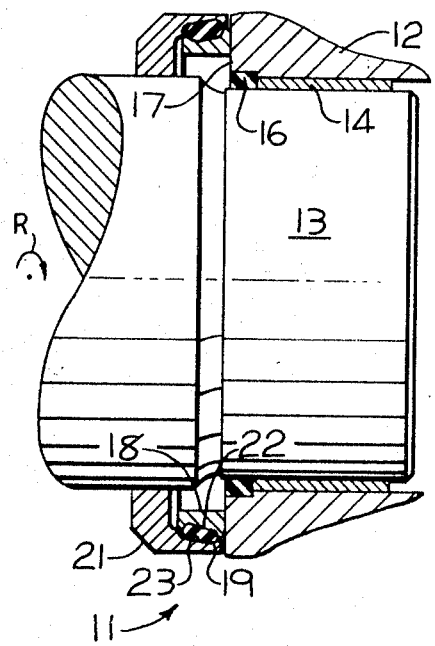
Fig_1_
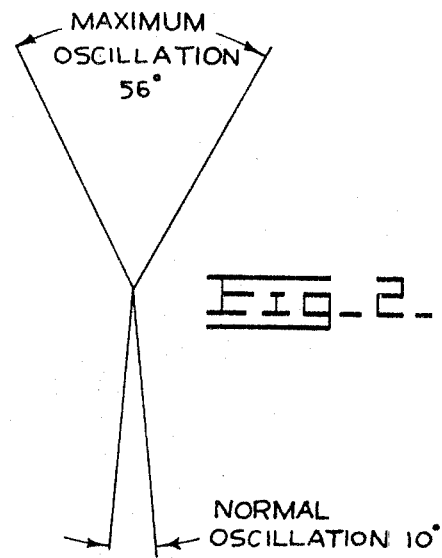
Fig_2_
MAXIMUM OSCILLATION 56°
NORMAL OSCILLATION 10°
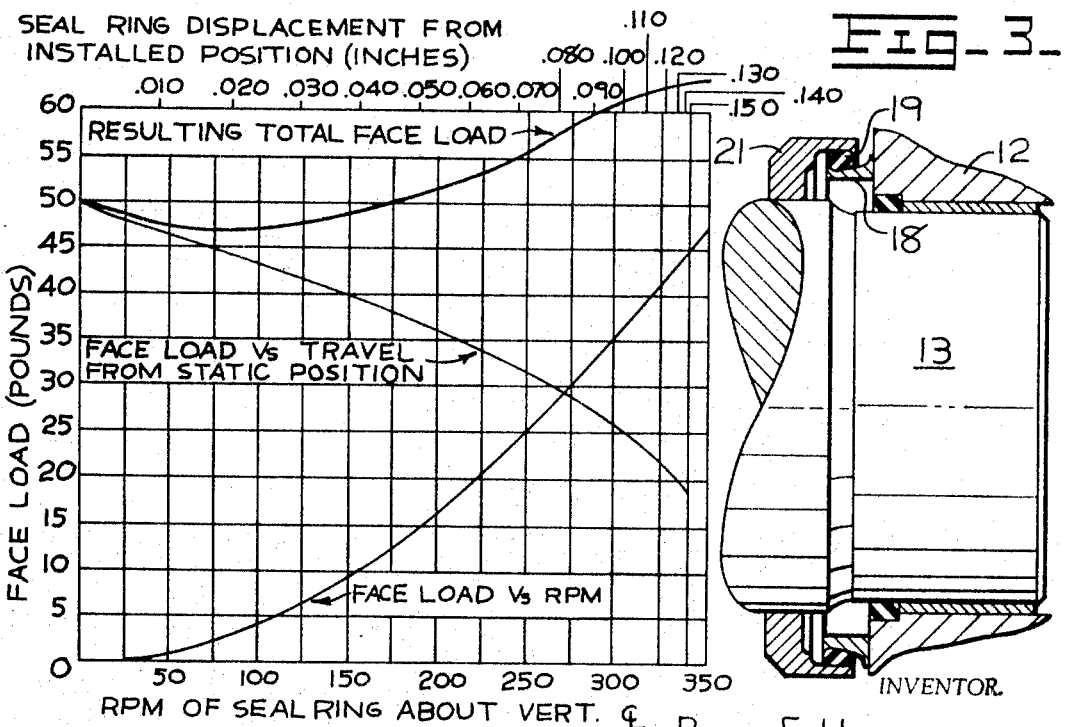
Fig_4_
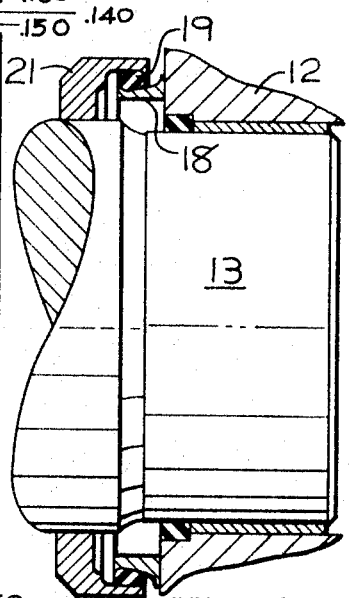
Fig_3_
INVENTOR.
ROLAND E. HASSELBACHER
BY
Fryer, Tjensvold, Feix & Phillips
ATTORNEYS

United States Patent Office 3,460,845
Patented Aug. 12, 1969

3,460,845
SEAL FOR HELICOPTER ROTOR BLADE PITCH CONTROL MECHANISM
Roland E. Hasselbacher, Brimfield, Ill., assignor to Caterpillar Tractor Co., Peoria, Ill., a corporation of California
Filed Mar. 23, 1966, Ser. No. 536,787
Int. Cl. F16j *15/38;* B64c *27/04*
U.S. Cl. 277—92                                     1 Claim

ABSTRACT OF THE DISCLOSURE

A face seal for variable pitch helicopter rotor blades having a floating seal ring associated by means of an O-ring with a retainer ring secured to the blade hub. To maintain substantially constant face loading between the seal ring and a seal surface of an inner end of the blade, loading ramps on the seal ring and retainer ring diverge so that the face load applied to the seal ring by the O-ring decreases as increasing centrifugal force axially shifts the seal ring and tends to increase the face load.

---

This invention relates to a rotary face seal for an assembly which is subjected to centrifugal force in a manner such that the centrifugal force tends to increase the face load of the seal. The present invention is particularly useful for keeping dirt from being centrifuged between the inner end of a variable pitch helicopter rotor blade and the rotor hub on which the rotor blade oscillates during pitch changes.

The pitch of a helicopter rotor blade must change, or cycle, with each revolution of the rotor assembly during most flight maneuvers. Conventional radial seals have been used between the rotor blade and the hub to keep dirt away from the bearing between the blade and the hub. However, this kind of seal has not been effective to keep abrasive material out of the bearing. There is a considerable amount of centrifugal force at the seal as a result of rotation of the rotor. When the helicopter is hovering over desert areas, sand and dirt picked up by the rotating blades is centrifuged into the seal area. This has resulted in failure of the conventional radial seals. Failure of the conventional radial seals has in turn allowed the sand to enter the bearing. This has caused malfunctions and at least partial seizures.

It is a primary object of the present invention to provide a seal which can operate in such abrasive environments and yet remain effective to perform its sealing function. This object is accomplished by using a highly abrasive resistant metal seal ring and resilent elastomeric O-ring suspension like that shown in U.S. Patent No. 3,180,648 to Kupfert et al. As disclosed in the Kupfert et al. patent, such seal rings and O-rings have proven quite satisfactory as track roller seals for crawler tractors subjected to severe abrasive environments.

Another factor which complicates the seal application for the helicopter rotor blade application is the relative movement, in an axial direction, between the rotor blade and the rotor hub as the rotor speed is increased. In one particular helicopter rotor assembly the rotor blade will move outward on the rotor hub about 0.15 inch as the rotor speed is run up from the start of rotation to the operating speed.

With face seals of the kind noted above, and described in the Kupfert et al. patent, the face load is critical. The face load must be maintained in a relatively narrow range to prevent loss of sealing contact (when the face load is too low) and to perevent fretting and galling (when the face load is too high).

The centrifugal force produced by the mass of the seal ring rotating at the rotor speed tends to increase the initially installed, or static, face load. This increase can make the total face load too large if the installed, or static, face load is not reduced by an appropriate amount.

It is another object of the present invention to take advantage of the axial movement of the rotor blade to reduce the static face load at a rate approximately equal to the increase in face load produced by the centrifugal force. This is accomplished in the present invention by reducing the compression of the O-ring as the rotor blade shifts outward on the hub.

Other and further objects of the present invention will be apparent from the following description and claims and are illustrated in the accompanying drawings which, by way of illustration, show a preferred embodiment of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claim.

In the drawings:

FIG. 1 is a fragmentary plan view, partly in section, of the inner end of a helicopter rotor blade incorporating a seal constructed in accordance with one embodiment of the present invention;

FIG. 2 is a diagrammatic end elevation view illustrating the normal and maximum oscillation of the rotor blade on the rotor hub;

FIG. 3 is a view like FIG .1 of a second embodiment showing the position to which the rotor blade shifts outward on the rotor hub when the rotor is revolving at its highest rotational speed; and FIG. 4 is a plot of the face loads for the various rotational speeds of the rotor.

In FIG. 1 a seal for a helicopter rotor blade pitch control mechanism constructed in accordance with one embodiment of the present invention is indicated generally by the reference numeral 11.

The inner end of the rotor blade 12 is supported on the rotor hub 13. The pitch of the rotor blade 12 must change or cycle with each revolution of the rotor assembly during most flight maneuvers. Thus, as the rotor revolves in the direction indicated by the arrow R (about a perpendicularly extending axis located to the left of the mechanism shown in FIG. 1), the blade 12 must oscillate about the hub 13. The normal amount of oscillation is about 10 degrees while the maximum oscillation is about 56 degrees as illustrated in FIG. 2.

The blade 12 oscillates on a Teflon-coated plastic bearing 14.

A conventional radial seal 16 is located at the inner end of the bearing 14. The seal 16 is intended to function to keep foreign matter from being centrifuged past the seal and into the bearing area. However, as noted above, there is a substantial amount of centrifugal force developed in the area of the seal 16, and the seal 16 has not been effective to keep sand and dirt (such as sand kicked up by hovering over desert areas) from being centrifuged past the seal and into the bearing.

In accordance with the present invention the seal 11 is installed at the inner end of the rotor blade pitch control mechanism to prevent foreign matter from entering the area of the radial seal 16.

The seal 11 includes a seal surface 17 formed on the end of the blade 12 to provide one of the seal elements of the rotary face seal. A metal seal ring 18, cast of highly corrosive and abrasive resistant material, is resiliently suspended and pressed against the surface 17 by an elastomeric O-ring 19.

A seal ring retainer 21 is fixed to the hub 13.

The load applied to the face of the ring 18, that part of the ring which is engaged with the surface 17, is dependent on the amount of compression of the O-ring 19. The O-ring 19 is free to roll along the inclined back surface 22 of the seal ring 18. Since the inclined surface 22, or ramp, of the seal ring diverges from the opposed surface 23 of the retainer 21 (in a direction inward of the hub 13) the size of the load applied by the O-ring 19 is dependent upon the axial position of the seal ring 18 within the retainer 21.

In the initially installed positions of the parts illustrated in FIG. 1 the face load is 50 pounds as indicated in FIG. 4.

As illustrated in FIG. 3 the rotor blade 12 moves outward on the hub 13 as the speed of rotation is run up from the at rest condition shown in FIG. 1 to the operational condition shown in FIG. 3. In one particular helicopter rotor assembly the rotor blade 12 moves 0.15 inch as the rotor speed is increased from zero r.p.m. to 342 r.p.m. In this condition of operation the centrifugal force resulting from rotation of the mass of the ring 18 and O-ring 19 builds up to a maximum value of about 45 pounds, as illustrated in FIG. 4.

In accordance with the present invention the divergence of the surfaces 22 and 23 is matched to the build-up in face loads because of centrifugal force to maintain the total face load within the narrow range indicated by the curve entitled "Resulting Total Face Load" in FIG. 4. Thus, the minimum face load is about 48 pounds at about 100 r.p.m. and the maximum face load is about 65 pounds at the maximum r.p.m.

This unique coaction between the build-up of face load produced by the centrifugal force and the decrease in face load produced by the travel resulting from the increase in centrifugal force effectively maintains the face load within the operative range of the seal 11.

While I have illustrated and described the preferred embodiment of my invention, it is to be understood that this is capable of variation and modification, and I therefore do not wish to be limited to the precise details set forth, but desire to avail myself of such changes and alterations as fall within the purview of the following claim.

I claim:

1. A structure including a hub having a high speed rotational movement about a first axis, a portion of said hub defining at least one second axis extending from said hub in a direction substantially normal to said first axis, an assembly comprising said hub portion and a member disposed outwardly therefrom along said second axis and having rotational movement relative to said hub portion about said second axis at a juncture between said portion and said member, said juncture being spaced from said first axis whereby said high speed rotational movement imparts to said juncture a high speed translatory movement in a circumferential path about said first axis and thus subjects said member to a centrifugal thrust tending to separate said member from said portion and thus spread the juncture therebetween, said member including a surface extending radially of said second axis and facing said juncture to provide a sealing surface, a seal disposed in said juncture and comprising a seal support carried by said hub portion and including an annular seal retainer extending toward said sealing surface of said member and terminating in a free edge spaced therefrom, said retainer comprising an annular seat bordered by a retaining lip adjacent to said free edge, a seal ring having a seal face complemental to and disposed against said seal surface and an annular seat facing said first mentioned annular seat to define and gap therebetween, at least one of said annular seats comprising a frusto-conical ramp surface diverging from the surface of the other of said seats, a resilient loading ring disposed in said gap between said seats with sufficient compression to bias said seal ring against said seal surface with a predetermined face load whereby said ring will follow said member during said separation of said member and said hub portion, said divergence of said seats being disposed to widen said gap upon said following movement of said seal ring and thereby reduce said compression and said predetermined face load to compensate for increased face loading resulting from the effect of said centrifugal thrust on said seal ring and said loading ring.

References Cited

UNITED STATES PATENTS

| | | |
|---|---|---|
| 2,829,721 | 4/1958 | Gebhard. |
| 3,007,654 | 11/1961 | Doman _____ 244—17.11 |
| 3,125,347 | 3/1964 | De Moude _____ 277—92 |
| 3,180,648 | 4/1965 | Kupfert et al. _____ 277—92 |
| 3,193,018 | 7/1965 | Gandy _____ 170—160.27 |
| 3,216,513 | 11/1965 | Robbins et al. _____ 277—92 X |

LAVERNE D. GEIGER, Primary Examiner

J. S. MEDNICK, Assistant Examiner

U.S. Cl. X.R.

170—160; 244—17